April 5, 1938.  A. L. JEANNE  2,113,256
FILM DRIVING MECHANISM
Filed Feb. 18, 1937

INVENTOR
A. L. JEANNE
BY
G. H. Heydt
ATTORNEY

Patented Apr. 5, 1938

2,113,256

UNITED STATES PATENT OFFICE 2,113,256

FILM DRIVING MECHANISM

Armand L. Jeanne, Garden City, N. Y., assignor to Bell Telephone Laboratories, Incorporated, New York, N. Y., a corporation of New York Application February 18, 1937, Serial No. 126,427

6 Claims. (Cl. 271—2.3)

This invention relates to film driving mechanisms and more particularly to such mechanisms employing a film driven inertia device for damping oscillations in the film.

The object of the invention is to provide an inexpensive sound film propelling mechanism capable of effectively suppressing all oscillations in the driven film likely to produce distortion in the recorded or reproduced sound.

A feature of the invention lies in the provision of a film driven inertia device comprising two fly-wheels mounted for rotation on a single fixed stud, one fly-wheel being driven by the film and the other fly-wheel being freely rotatable with respect to the first fly-wheel but connected thereto by a non-positive driving means and a positive driving means contained wholly within the fly-wheels, the positive driving means being responsive to centrifugal force to release the second fly-wheel to the driving action of the non-positive or slippable driving means alone at running speed.

In a well-known type of sound film driving mechanism, a driven film engages and produces rotation of a supporting drum which itself has considerable mass or to which a fly-wheel is attached for rotation therewith. The mass of the film driven fly-wheel operates to suppress oscillations transmitted to the film by the film driving means. This type driving means is not, however, capable of suppressing the resonant oscillations at the natural frequency determined by the fly-wheel inertia and the film loop stiffness.

In an improved film driving mechanism of the type employing a film driven fly-wheel, the inertia of this low frequency resonant oscillation is dissipated to a great extent by means of a second fly-wheel freely rotatable with respect to the film driven fly-wheel and driven from the film driven fly-wheel through the medium of a viscous fluid. The cost of this improved film driving mechanism employing a viscous liquid as the driving medium is necessarily relatively high and therefore projecting apparatus equipped therewith does not come within a price range permitting purchase thereof by a great number of small theaters.

Applicant's invention provides in a film driving mechanism an inexpensive damping means capable of effectively suppressing the resonant oscillation at the natural frequency determined by the fly-wheel inertia and the film loop stiffness. The damping means of applicant's invention comprises a pair of fly-wheels mounted for rotation on a common fixed support. One fly-wheel is film driven and the second fly-wheel, which is freely rotatable with respect to the first fly-wheel, is driven therefrom at running speed through friction means resiliently mounted on one fly-wheel and engaging the other fly-wheel with sufficient friction to produce rotation of the driven fly-wheel at uniform running speed but permitting relative movement of the driven fly-wheel with respect to the driving fly-wheel to dissipate the energy of the low frequency resonant oscillation at the natural frequency determined by the inertia of the fly-wheel and film loop stiffness. A positive driving means responsive to centrifugal force is mounted for operation within the fly-wheels to shunt the frictional driving means at starting speed.

The invention may be more readily understood by reference to the accompanying drawing in which.

Figure 1:
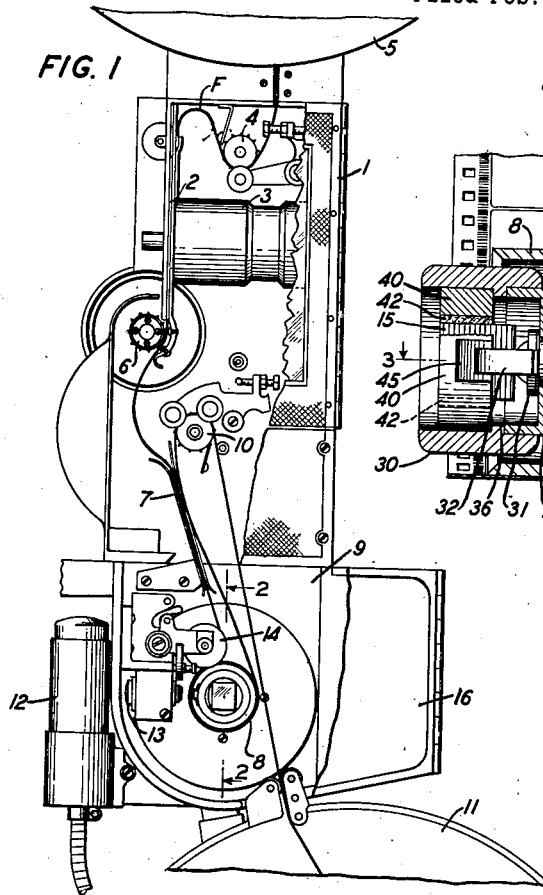
Fig. 1 is a side elevation of a sound picture film projection machine disclosing the path of a sound picture film from the feed reel to the take-up reel.

Referring to Fig. 1, numeral 1 denotes a picture projection apparatus including a film gate 2 and a projection lens system included in a tube 3. A film F is drawn from a feed reel located in a reel housing 5 by means of a feed sprocket 4. The film is drawn past the picture projection aperture through film gate 2 by means of an intermittent sprocket 6. A loop is formed in the film between intermittent sprocket 6 and a flat film guide 7. After passing the guide 7, film F engages freely rotatable film supporting drum 8 located in housing 9. From the drum 8 the film travels to the take-up sprocket 10 of projector 1 and from this sprocket to a take-up reel located in reel housing 11.

Light from an exciting lamp located in a lamp housing 12 is projected to the overhanging record portion of the film F on roller 8 by means of lens elements located in an adjustable lens tube 13. An axially adjustable flanged guide roller 14 guides the film to drum 8 and provides means for adjusting the film laterally in the optical system. A right angle prism 15 disposed inwardly of drum 8 directs the modulated light rays from the film record to a photoelectric cell mounted in a door 16 of compartment 9.

Figure 2:
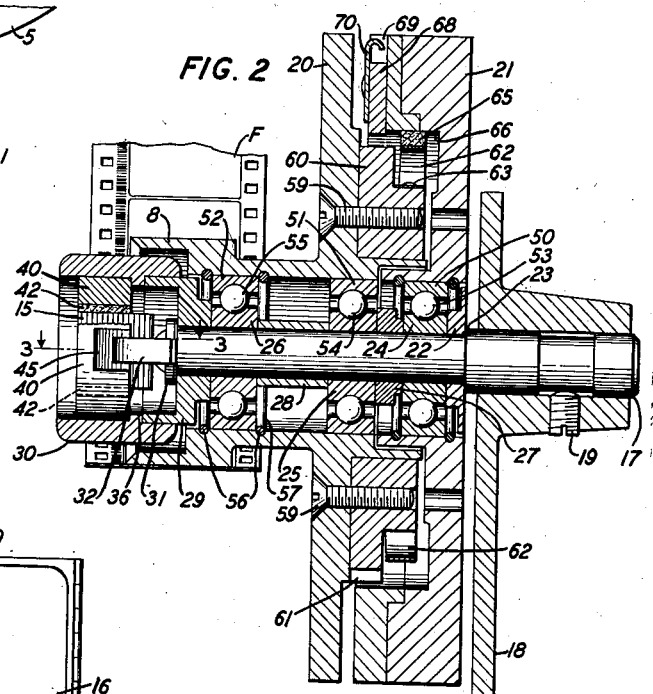
Fig. 2 is an enlarged section taken through the line 2—2 of Fig. 1 disclosing a film supporting damping means employed at the point of sound translation.
Figure 4:
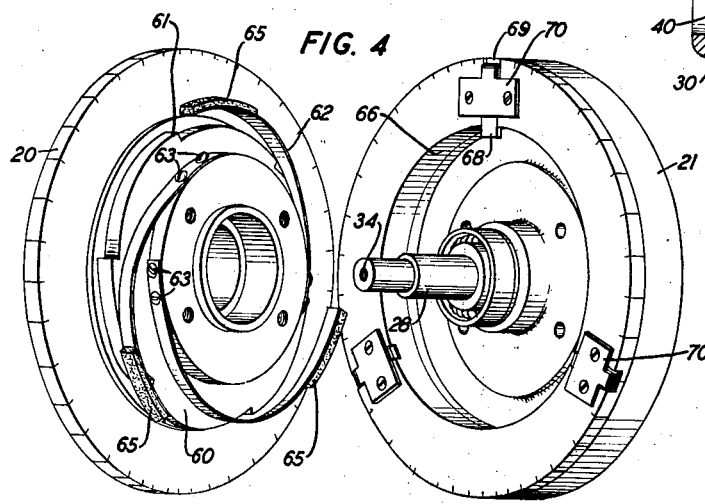
Fig. 4 is an exploded view in perspective of the pair of fly-wheels disclosed in Fig. 2.

Referring to Fig. 2, one end of a stud 17 fits into a boss in the inner vertical wall 18 of housing 9 and is held therein by means of a set screw 19. Stud 17 forms the support for drum 8, fly-wheels 20 and 21. A spacing member 22, fitted on stud 17, bears against flanged portion 23 thereof. Inner ball races 24, 25 and 26 and spacing members 27, 28 and 29 are fitted on stud 17. A final spacing member 29 fitted on stud 17 serves as the anchoring member for a removable prism holder 30. A washer 31 and a spring 32 are clamped against the end of stud 17 by means of a machine screw 33 which engages a threaded hole 34 (Fig. 4) in the free end of stud 17. The washer 31 and spring 32 bear against one face of spacing member 29 under the action of screw 33 to form with the flange 23 a clamping arrangement for the inner ball races and spacing members.

Suitable means are provided for mounting prism 15 in prism holder 30. Prism holder 30 slides over spacing member 29. An internal circular flange 36 acts as a stop to limit the inward movement of this prism holder on the spacing member. A slot 38 provided in member 29 receives a pin 37 secured in member 30. As the prism holder 30 is placed in position, the pin 37 enters slot 38 against the action of spring 32. The slot and pin, therefore, act as means for centering the holder in correct position. It will be seen that prism holder 30 is readily removable from the projecting apparatus for replacement or cleaning.

Figure 3:
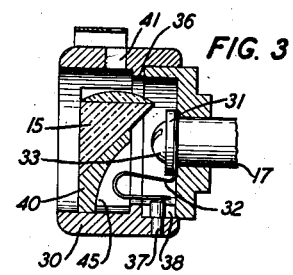
Fig. 3 is a sectional view of the prism mounting taken though line 3—3 of Fig. 2.

A single piece metal member 40 fits into holder 30 and is held in place therein by means of set screws (not shown) located in the prism holder 30. As shown in Fig. 3 the member 40 does not extend in front of the prism adjacent aperture 41 in member 30. Member 40 has a central cutout portion to receive the prism 15. Top and bottom layers 42 of some suitable material, such as cork, provide a suitable cushioned mounting for the prism 15 in member 40. As shown in Figs. 2 and 3, member 40 is provided with a cut-away portion 45 to provide clearance for spring 32.

Outer ball races 50, 51 and 52 are rotatable on a plurality of ball bearings 53, 54 and 55, respectively. The drum 8 and its integral fly-wheel 20 are fitted on outer ball races 51 and 52 and fly-wheel 21 is fitted on outer ball race 50. Internal circular grooves 56 are provided in the drum 8 to receive split spring rings 57 to prevent lateral slipping of the drum and fly-wheel 20 relative to the ball bearing. The same construction is applied to fly-wheel 21 to prevent lateral slipping of this fly-wheel relative to its ball bearing.

Fly-wheel 20 has attached thereto by means of machine screw 59, a circular member 60 having a plurality of stepped coaxial surfaces. Ratchet teeth 61 are formed on one of the stepped coaxial surfaces of member 60. A plurality of spring members 62 are secured to another stepped coaxial surface of member 60 by means of machine screws 63. To the free end of each member 62 there is secured a rectangular piece 65 of felt, chamois or other suitable material which bears against inner surface 66 of fly-wheel 21 under the action of members 62 to provide a frictional driving connection from fly-wheel 20 to fly-wheel 21.

Pins 68 are slidable in slots 69 in fly-wheel 21. When the machine is at rest or the drum and fly-wheels are rotating at a speed less than running speed pins 68 engage ratchet teeth 61 on fly-wheel 20 to provide a positive drive between the two fly-wheels at starting speed. As the force of gravity will cause the pin to disengage from the teeth throughout a certain period of rotation of the fly-wheels, a plurality of spaced pins 68 are provided to insure that at least one pin will be in engagement with the teeth 61 at all times during the starting period. At running speed centrifugal force causes the pins 68 to disengage from teeth 61 and thereby release the fly-wheel 21 to the driving action of the frictional driving members 65. Pins 68 are held in slot 69 by members 70 which have reduced hooked end portions which act as limiting stops for pins 68.

The damping means in accordance with this invention will efficiently suppress low frequency oscillation in the film. Due to the relatively large mass of the fly-wheels and the stiffness of the film, the natural frequency of the damping means as determined by the inertia of the fly-wheels and stiffness of the loop of film engaged in driving the fly-wheels, is relatively low and the amplitude of the oscillation at this natural frequency is relatively great. The free fly-wheel 21, because of the frictional drag of felt members 65 upon relative motion of the fly-wheels obviously reduces the amplitude of oscillation of fly-wheel 20, and frictionally absorbs the energy of the oscillation.

It is important that the frictional driving means including members 65 be set as to pressure to permit slipping when the amplitude of the oscillation is well below a value at which noticeable distortion would be introduced into the recorded or reproduced sound.

By the novel means provided by applicant comprising light spring metal strips 62, it is possible to resiliently support the felt members 65 in correct frictional engagement with fly-wheel 21. The strips 62 in addition to providing a resilient support for the energy dissipating members 65 also automatically compensate for wear of these members with use.

In this disclosure the natural frequency of oscillation of the two fly-wheels is approximately one-third cycle per second. The pressure on the felt pads is designed so that slipping and therefore energy dissipation will begin when the instantaneous velocity of the fly-wheels varies ±.1 per cent from the normal velocity of the fly-wheels.

What is claimed is:

1. In combination with a film driving apparatus, a drum arranged to be engaged and driven by the film, a fly-wheel coupled to said drum, a second fly-wheel freely rotatable with respect to said drum, means forming a frictional driving connection between said two fly-wheels, and means contained wholly within said fly-wheels forming a positive connection between said fly-wheels at starting speed.

2. In combination with a film driving apparatus, a film supporting drum adapted to be engaged and driven by the film, vibration damping means associated with said drum, said means comprising a first fly-wheel coupled to said drum, a second fly-wheel of greater inertia than said first fly-wheel and freely rotatable with respect to said drum, a plurality of driving means connecting said fly-wheels, one of said driving means comprising a plurality of frictional bearing surfaces secured to said first fly-wheel and engaging the surface of said second fly-wheel to provide a slipping driving connection therebetween, the other of said driving means comprising a plurality of centrifugally responsive devices forming a positive driving connection between said fly-wheels at starting speed whereby said first driving means is shunted during starting rotation of said drum.

3. A combination in a sound film recording and reproducing apparatus having film driving elements, vibration damping means comprising a pair of fly-wheels mounted for rotation on a common fixed stud, one of said fly-wheels adapted to be driven by said film and the other of said fly-wheels being freely rotatable with respect to the film driven fly-wheel, a plurality of driving means mounted on and connecting said fly-wheels, one of said driving means being responsive to centrifugal force to release its driving connection between said fly-wheels at a predetermined rotational speed of said freely rotatable fly-wheel.

4. In combination in a film driving apparatus, a film supporting drum adapted to be engaged and driven by the film, vibration damping means associated with said drum, said means comprising a first fly-wheel coupled to said drum, said first fly-wheel having stepped coaxial surfaces one of which is provided with teeth, a second fly-wheel coaxial with but freely rotatable with respect to said first fly-wheel having a central recessed area into which several of the stepped coaxial surfaces of said first fly-wheel project, centrifugally responsive means mounted on said second fly-wheel to be engageable with the toothed periphery of one of the stepped coaxial surfaces of said first fly-wheel, a plurality of flexible members each having one end secured to another of the stepped coaxial surfaces of said first fly-wheel, the free ends of each of said flexible members frictionally engaging a surface of said second fly-wheel.

5. In combination in a film driving apparatus, a film supporting drum adapted to be engaged and driven by the film, vibration damping means associated with said drum, said means comprising a first fly-wheel coupled to said drum, a second fly-wheel coaxial with but freely rotatable with respect to said first fly-wheel, centrifugally responsive means mounted on said second fly-wheel to be engageable with toothed means on said first fly-wheel, elongated resilient members secured to one of said fly-wheels, said resilient members supporting means in frictional engagement with the other of said fly-wheels.

6. A combination in a film driving apparatus, a film driven fly-wheel, a freely rotatable fly-wheel, two independently operable driving mechanisms interposed between said fly-wheels, one of said driving mechanisms being responsive to a predetermined rotational speed of said fly-wheels to make it ineffective at rotational speeds greater than the predetermined speed.

ARMAND L. JEANNE.